United States Patent [19]
Benjamin

[11] Patent Number: 4,832,225
[45] Date of Patent: May 23, 1989

[54] SPLASH DEFLECTOR FOR COOKING CONTAINERS

[76] Inventor: Larry R. Benjamin, 12105 Klendon Dr., Yakima, Wash. 98908

[21] Appl. No.: 173,074

[22] Filed: Mar. 25, 1988

[51] Int. Cl.⁴ ............................................. B65D 51/18
[52] U.S. Cl. ..................................... 220/254; 99/413
[58] Field of Search ......................... 220/254; 99/413; 126/369

[56] References Cited

U.S. PATENT DOCUMENTS

D. 31,820  11/1899  Davidson .
1,706,491   3/1929  Jenkins .
1,867,994   7/1932  Wisenor et al. ..................... 220/254
2,053,568   9/1935  Levin .
2,463,613   3/1949  Hagen .
2,628,738   2/1953  Hilldale .
2,917,218  12/1959  Guyer .
3,941,967   3/1976  Sumi et al. .

Primary Examiner—George T. Hall
Attorney, Agent, or Firm—Seed and Berry

[57] ABSTRACT

A splash deflector for cooking containers is disclosed which includes an annular shaped deflecting member for preventing liquids from being splashed out of the container. Means are provided for releasably mounting the deflector to the container in a manner to provide a substantially liquid tight seal yet to also allow quick removal of the deflector. A supporting member is also disclosed for supporting a lid thereby to create a closed container cooking environment.

18 Claims, 2 Drawing Sheets

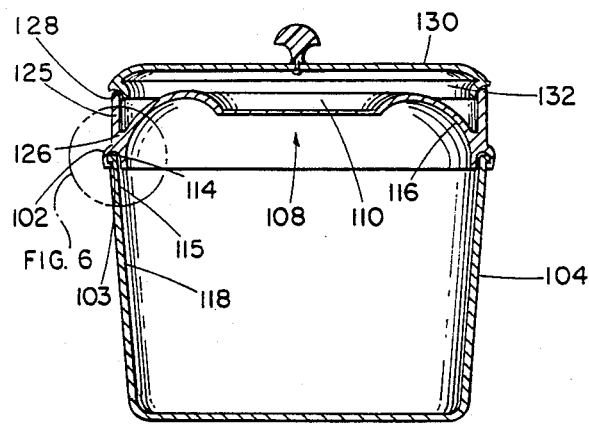
FIG. 4
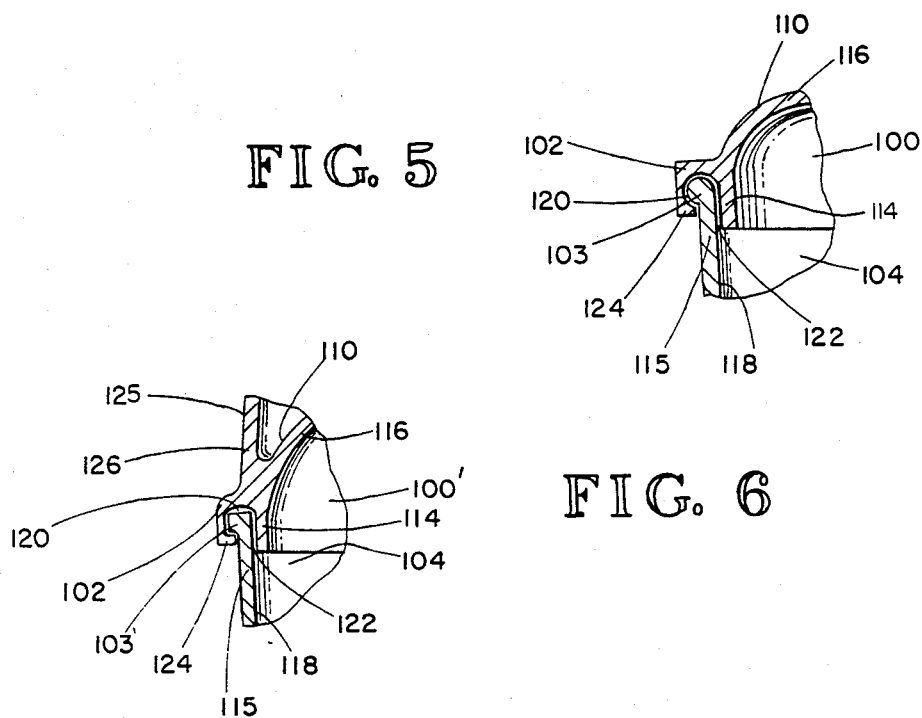
FIG. 5
FIG. 6

SPLASH DEFLECTOR FOR COOKING CONTAINERS

DESCRIPTION

1. Technical Field

The present invention is directed toward cooking containers and, more particularly, toward apparatus and method for preventing liquid from splashing out of a cooking container.

2. Background of the Invention

Cooking containers are generally provided with lids to contain heat and prevent splashing while cooking liquid materials. When frying using oils and other high heat liquids a lid is required to contain spattering liquids. The lid is also very effective in preventing splashing and spillage. The lid is, however, only effective while it is on the pot. Removal is necessary for a variety of reasons including: to season the materials being cooked; to stir the materials being cooked; to visually check the general progress of the materials being cooked; and to serve the materials being cooked.

The problem of spillage noted above is particularly acute when cooking in a vehicle such as a trailer, boat, airplane or other vehicle equipped for food preparation. For example, when the boat tilts or drops, boiling water can easily slosh out of the pot when the lid is removed for stirring and cause serious burns to the cook. In such circumstances even with the lid on the pot the force of the liquid against the lid can sometimes knock off the lid and splash onto the cook.

Therefore, it is desirable to provide apparatus and method for preventing liquid from splashing from a cooking container while the lid is removed for stirring, viewing or otherwise working with the container's contents being cooked. The apparatus should also prevent splashing even with the lid removed. It is also desirable to provide an apparatus which is readily separable from the cooking container to facilitate cleaning of both the apparatus and the cooking container. It is also desirable to provide such an apparatus for preventing liquid from splashing from a cooking container which allows for ready use of the existing container lid.

DISCLOSURE OF THE INVENTION

It is, therefore, an object of the present invention to provide a deflector for preventing liquid from splashing from a liquid container.

It is also an object of the present invention to provide a deflector for preventing liquid from splashing from a cooking container, which deflector can be readily separated from the cooking container to facilitate cleaning of both the container and the deflector.

It is another object of the present invention to provide a deflector for preventing liquid from splashing from a cooking container, which deflector allows for ready use of the original container lid.

These and other objects of the present invention are achieved by providing a splash deflector for cooking containers. The cooking container is of the type having a circumferential sidewall with an upper lip defining an open end and a lid to cover at least a portion of the open end. The splash deflector comprises a cover having an aperture for access to liquids cooking within the container through the open end thereof. The cover includes splash deflector means for deflecting splashed liquids cooking within the container thereby to prevent the liquids from passing outward through the container open end. The cover is circumferentially sized substantially coextensive with the circumference of the container sidewall to cover the open end of the container. The splash deflector also includes mounting means for removably attaching the cover to the container sidewall and supporting means for supporting the lid for selectively covering the cover aperture.

In alternate embodiments, the deflector means may comprise an annular shaped member adapted to extend upward from the sidewall of the container and curve inward and downward toward the center of the container. The mounting means of the deflector may include a gripping member for gripping the lip of the container sidewall. The supporting means may comprise a supporting wall adapted to extend upwardly from the container sidewall and end in a free upper end having a circumference which is substantially coextensive with the circumference of the open end of the container.

The apparatus and method which are regarded to be the invention are particularly pointed out and distinctly claimed in the numbered paragraphs appended hereto. The invention, however, both as to organization and method of practice, may best be understood from a reading of the following detailed description taken in conjunction with the accompanying drawings.

BRIEF DESCRIPTION OF THE DRAWINGS

FIG. 4 is a sectional view of the container and splash deflector taken along lines 4—4 of FIG. 3;

FIG. 5 is an enlarged cross-sectional view of the section of the splash deflector shown in circle 5 in FIG. 2; and FIG. 6 is an enlarged cross-sectional view of the section of the splash deflector shown in circle 6 in FIG. 4.

DETAILED DESCRIPTION OF THE INVENTION

Figure 1:
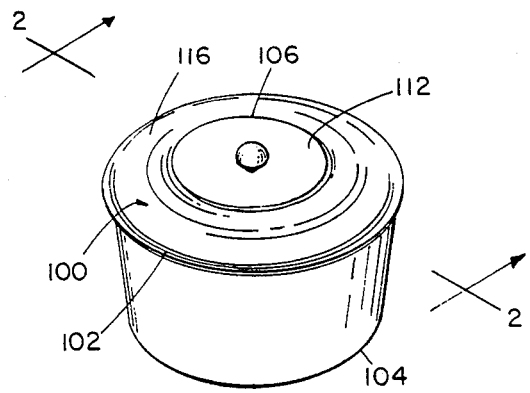
FIG. 1 is a perspective view of a cooking container including the splash deflector which is the subject of the present invention.
Figure 2:
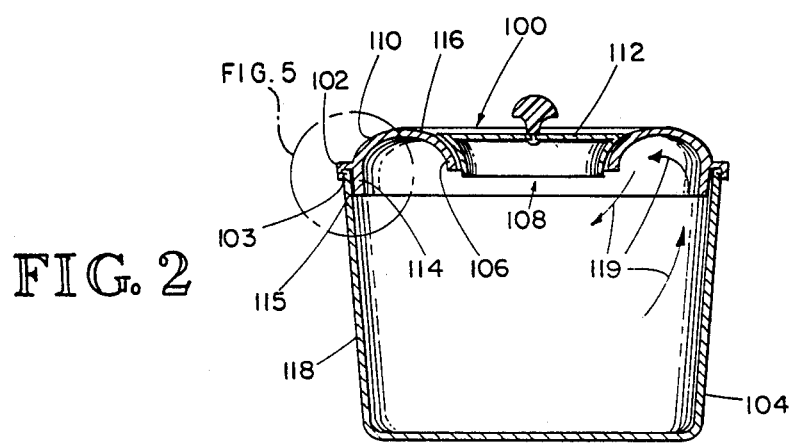
FIG. 2 is a sectional view of the container and splash deflector taken along lines 2—2 of FIG. 1.

The present invention is directed toward an apparatus and a method for use thereof with cooking containers, to prevent liquids and other materials from splashing outside of the container while still allowing ready access to the container's contents being cooked. Such splashing causes spillage and possibly personal injury. As shown in FIGS. 1 and 2, the apparatus which is the subject of the present invention comprises an annular splash deflector 100 having an outside edge portion 102 adapted to matingly fit a circumferential rim 103 of a cooking container 104, a central inside edge portion 106 defining a central opening 108 through which the container's contents can be accessed without removal of the splash deflector, and an outwardly protruding concaved body portion 110 extending from interior of the cooking container rim to the central inside edge portion of the splash deflector to inwardly deflect splashes.

The cooking container 104 is shown in FIG. 1 as a pot but alternatively may comprise a kettle, skillet, frying pan, or other cooking container adapted to contain liquid or semi-liquid cooking materials. The splash deflector 100 of FIG. 1 also includes a removable lid 112 which is adapted to matingly fit within the center inside edge portion 106 of the splash deflector.

As shown more fully in the sectional view of FIG. 2, the body portion 110 of the splash deflector 100 is substantially curvilinear in cross-sectional contour. The body portion 110 has a rim portion 114 positioned inwardly of the container rim 103 and an upper sidewall portion 115 of a sidewall 118 of the container 100, with the rim portion 114 in close proximity therewith. The body portion 110 extends from the rim portion 114 and continues along a mid-portion 116 which curves upward and, inwardly of the container sidewall 118, curves downward toward the center of the container 104. The mid-portion 116 terminates at the central inside edge portion 106 to define the central opening 108. The central opening 108 is of sufficiently large size to facilitate stirring and viewing of the material being cooked within the container 104, and sufficiently small in size to minimize splashing of material through the opening. Preferably the central opening 108 has a diameter of one-third or less the diameter of the container.

As best shown in FIG. 2, the curvilinear contour of the body portion 110 of the splash deflector 100 facilitates containment of splashing liquids by redirecting splashed liquids downward toward the cooking material. As liquid moves up the sidewall 118 of the container 104 such as when the container 104 is rapidly tilted, the liquid reaches and is deflected by the rim portion 114 of the splash deflector 100 which fits snuggly against the inside surface of the container sidewall, thus directing the liquid flow upward, and in combination with the outside edge portion 102 of the splash deflector as will be described in more detail below, preventing escape of the liquid. The curvilinear contour of the mid-portion 116 of the body portion 110 then redirects the liquid flow inward and downward. The flow of liquid described is shown by the arrows 119 in FIG. 2.

It will be appreciated, however, by those skilled in the art that while the splash deflector 100 is shown having a cross-sectional curvilinear contour in FIGS. 1 and 2, the splash deflector may be contoured in any manner designed to prevent spillage from the container 104. As an example, the splash deflector 100 may have a planar body mid-portion extending from the rim portion 114 at the container rim 103 horizontally inward toward the center of the container 104 and terminating with a downward turned portion to define the central opening 108. Many other contours for splash deflector 100 will readily become apparent to those skilled in the art.

As shown in FIG. 2, lid 112 is sized and has a contour adapted to fit snuggly against the exterior down-turned surface of the body mid-portion 116 and within the center inside edge portion 106 of splash deflector 100 to close the central opening 108. The lid 104 is supported by the body mid-portion 116 and provides a tight fit while the container 104 is in use, but yet is easily removable by the user. Alternatively, the lid may be manufactured to snap-fit to the body mid-portion. Since the flow of any splashed liquid mostly passes clear of the lid, it is not dislodged by splashing of the liquid. Again, it will be apparent to those skilled in the art that lid 112 may comprise a variety of shapes adapted to fit the contour of splash deflector 100.

The splash deflector 100 shown in FIG. 2 has the outside edge portion 102 adapted to securely, yet releasably, mount on the circumferential rim 103 of the container 104. As best shown in FIG. 5 (which is an enlarged view of the encircled portion of FIG. 2), the outside edge portion 102 includes a circumferential recess 120 with a downwardly opening annular passageway 122. To attach the splash deflector 100 on the container 104 the two are pressed together to force the container rim 103 through the passageway 122 and into the recess 120 which is sized to receive and releasably retain the container rim. The passageway 122 is smaller in cross-section than the thickness of the container rim 103 to provide a snap-fit thereon, and is defined by the space between the rim portion 114 of the splash deflector and a circumferential inwardly projecting lip 124. When the container rim 103 is in position within the recess 120, the lip 124 extends below the outwardly protruding bead shaped rim to releasably hold the splash deflector to the container. The splash deflector 100 is thus secured to the rim of the container when the container is tipped or tilted even under the impact of fluid thereagainst. A snug fit is provided so that any fluid entering between the rim portion 114 of the splash deflector 100 and the upper sidewall portion 116 of the container sidewall 118 is prevented from leaking out.

The splash deflector 100 is manufactured of a sufficiently resilient material such that the outside edge portion 102 can flex sufficiently to permit entry of the container rim 103 through the passageway 122. The recess 120 is shown in FIG. 5 with a generally circular cross-sectional interior shape to receive the bead shape of the container rim 103.

The splash deflector 100 is removable by the user, as is the lid 112, and is washable disassembled from the container 104 to facilitate easy care. The splash deflector can also be interchangeably used with any container with the appropriate diameter rim.

Figure 3:
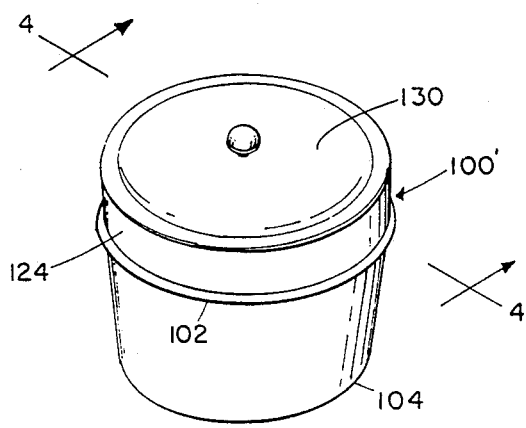
FIG. 3 is a perspective view of another cooking container including an alternate configuration for the splash deflector.

An alternate embodiment of a splash deflector 100' in accordance with the present invention is shown in FIGS. 3 and 4. The splash deflector 100' is constructed to be mounted upon a rim 103' of the container 104 much of as with the embodiment of FIG. 1 except that the circumferential recess 120 has a cross-sectional interior shape to generally match the container rim, which in this embodiment is shown as having a squared cross-sectional shape. The splash deflector 100' further includes a circumferential lid supporting wall 125 which is attached by a lower edge 126 at the junction of the outside edge portion 102 and the body portion 110, and projects upwardly, terminating in a free upper edge 128. The upper edge 128 provides support for a lid 130. The supporting wall 125 of the splash deflector 100' of FIG. 3 is sized to substantially equal the diameter of the upper sidewall portion 115 of the container 104 and thus to support the lid 130 of the same size as the original lid purchased for the container 104. In this manner, a special lid need not be purchased for use with the splash deflector but, instead, the original lid of the container may be used.

With the embodiment of FIGS. 3 and 4 the lid 130 is held spaced above the body portion 110 of the splash deflector 100', and a free space 132 which allows the energy of any liquid that should splash out the central opening 108 to dissipate before hitting the lid. Thus, it is less likely to knock the lid off the splash deflector and splash outward onto the handler of the container 104. In addition, should liquid splash out of the central opening 108 without the lid 130 on, the supporting wall 125 provides a barrier and reduces the chance that the liquid will get onto the person holding the container 104.

It will be apparent to those skilled in the art that the outside edge portion 102 may be modified to use other gripping devices than those shown in FIGS. 5 and 6 and may comprise many forms adapted to removably secure the splash deflector to containers which have various contours of rims. Further, it will be apparent to those skilled in the art that while the outside edge portion 102 shown grips the entire circumference of the container 104, the splash deflector may be provided with a plurality of gripping devices which are spaced about the circumference of the container.

The splash deflector described herein may be made from a sufficiently flexible material that it can be flexed to fit the circumference of containers with different shaped rims. Further, the splash deflector may be manufactured as a single unitary device, excluding the lid 112 in the embodiment of FIG. 1, or may comprise several portions adapted to be assembled.

Although only several embodiments have been described in detail herein, it will be apparent to those skilled in the art that many variations and modifications may be made to the subject splash deflector without departing from the true spirit and scope of the invention. Accordingly, it is the intention of the inventor to embody all such modifications and variations in the numbered claims appended hereto.

I claim:

1. Splash deflector apparatus for cooking liquids in a container wherein the container includes a circumferential sidewall with an upper wall portion defining an open end and a lid to at least cover a portion of the open end, the splash deflector apparatus comprising:
   a cover for the container having an aperture sized sufficiently large for access with cooking tools to the liquids cooking within the container through the container open end, said cover also having splash deflector means for deflecting splashed liquids cooking within the container inward and downward away from said cover aperture to prevent the splashed liquids from passing outward through said cover aperture, said cover being circumferentially sized substantially coextensive with the circumference of the container sidewall to cover the container open end;
   mounting means for removable attaching said cover to the container sidewall; and
   supporting means for supporting the lid for selectively covering said cover aperture.

2. The apparatus of claim 1 wherein said splash deflector means has an annular wall portion in the shape of an annular band extending circumferentially about the container open end and projecting downwardly interior of the container upper wall portion in close proximity therewith, said annular wall portion being angled to deflect the splashed liquids upward toward a upper portion of said splash deflector means which then deflects the splashed liquids deflected by said annular wall portion inward and downward away from said cover aperture, said annular wall portion further providing a seal with the container upper wall portion to prevent escape of the splashed liquids therebetween.

3. Splash deflector apparatus for cooking liquids in a container wherein the container includes a circumferential sidewall with an upper wall portion defining an open end and a lid to at least cover a portion of the open end, the splach deflector apparatus comprising:
   a cover for the container having an aperture sized sufficiently large for access with cooking tools to the liquids cooking within the container through the container open end, said cover also having splash deflector means for deflecting splashed liquids cooking within the container thereby preventing the splashed liquids from passing outward through said cover aperture, said splash deflector means being an annular deflector wall with a substantially curvilinear cross-sectional shape extending up from a lower outer edge positioned at the container sidewall, curving upward and inward, and curving down toward the center of the container to a lower inner edge defining said aperture, said cover being circumferentially sized substantially coextensive with the circumference of the container sidewall to cover the container open end;
   mounting means for removable attaching said cover to the container sidewall; and
   supporting means for supporting the lid for selectively covering said cover aperture.

4. The apparatus of claim 1 wherein said mounting means includes a circumferentially extending gripping member with a recess to receive the container upper wall portion, said gripping member securely yet removably grasping the upper wall portion when inserted into said recess thereby removably securing the splash deflector to the container.

5. The apparatus of claim 4 wherein said gripping member forms a substantially fluid-tight seal with the upper wall portion when inserted into said recess.

6. The apparatus of claim 1 wherein said mounting means comprises a gripping member extending about the entire circumference of said deflector means and formed integrally therewith.

7. The apparatus of claim 1 wherein said splash deflector means includes an annular deflector wall extending inwardly from the container sidewall toward the center of the container to a position from the container sidewall at least one-third of the diameter of the container to define said aperture as a center opening in said deflector wall with a diameter no greater than one-third the diameter of the container.

8. The apparatus of claim 1 wherein said support means includes a support wall extending upwardly and above said splash deflector means and having an upper edge portion with a diameter substantially equal to the diameter of the container and shaped to receive the contained lid, whereby a lid sized for the container open end can be used with the splash deflector apparatus for covering said cover aperture.

9. The apparatus of claim 1 wherein said splash deflector means includes a deflector wall and said support means includes an exterior generally upward facing surface thereof adjacent to said aperture, the upward facing surface being shaped to supportingly receive the lid resting thereon.

10. The apparatus of claim 1 wherein said splash deflector means, mounting means and supporting means are formed as a unitary device.

11. A splash deflector for cooking liquids in a container of the type having a circumferential sidewall with an upper sidewall portion terminating in an upper end which defines an open end of the container, the splash deflector comprising:

a cover for the container having an aperture sized sufficiently large for access with cooking tools to the liquids, said cover including means for deflecting liquids splashed from the container inward and downward away from said cover aperture to prevent the splashed liquids from passing outward through said cover aperture, said deflector means defining the aperture of said cover, said cover being sized and adapted to substantially fit the circumference of the container to cover the open end of the container such that the aperture of said cover provides access to the liquids cooking in the container;

mounting means for removably attaching said cover to the container sidewall;

a lid for said cover sized to selectively cover said cover aperture; and supporting means for supporting said lid to allow selective covering of said cover aperture.

12. A splash deflector as recited in claim 11 wherein said supporting means includes a circumferential supporting wall adapted to extend upwardly from the container sidewall and terminate in a free upper end having a circumference which is substantially equal to the circumference of the container open end and shaped to receive said lid for covering said cover aperture, said supporting wall being attached in fluid-tight arrangement with said cover and extending circumferentially around said cover aperture and spaced therefrom to define a barrier and an annual fluid-tight holding container to capture and contain any of the splashed liquids which do pass outward through said cover aperture.

13. A splash deflector for cooking liquids in a container of the type having a circumferential sidewall with an upper sidewall portion terminating in an upper end which defines an open end of the container, the splash deflector comprising:

a cover for the container having an aperture sized sufficiently large for access with cooking tools to the liquids, said cover including deflector means for deflecting liquids splashed from the container, said deflector means comprising an annular shaped deflector member having a rim portion adapted to be positioned inwardly of the container upper sidewall portion in close proximity thereto such that said rim portion extends downwardly below the container upper end interior of the container, said deflector member having a curvilinear body portion which extends upward from said rim portion and curves interior of the container open end and downward toward the center of the container, said body portion ending in a central inside edge portion which defines said cover aperture, said cover being sized and adapted to substantially fit the circumference of the container, thereby covering the open end of the container such that said cover aperture provides access to the liquids cooking in the container;

mounting means for removable attaching said cover to the container sidewall;

a lid for said cover sized to selectively cover said cover aperture; and supporting means for supporting said lid to allow selective covering of said cover aperture.

14. Apparatus as recited in claim 13 wherein said mounting means comprises an outside edge portion having a gripping member and a recess, said gripping member and said rim portion of said deflector member defining a channel for receiving the container upper sidewall portion therein such that said gripping member securely yet releasably attaches said splash deflector to said container.

15. Apparatus as recited in claim 14 wherein said outside edge portion of said mounting means is substantially coextensive with the circumference of the open end of the container.

16. Apparatus as recited in claim 15 wherein said supporting means includes a circumferential supporting wall adapted to extend upwardly from the container sidewall and terminate in a free upper end having a circumference which is substantially equal to the circumference of the container open end.

17. Apparatus as recited in claim 15 wherein said supporting means comprises annular shaped support members rigidly attached to and extending from said lid and adapted to matingly fit with said inside edge portion of said deflector member.

18. A method for preventing liquid from splashing out of a cooking container of the type including a circumferential sidewall having an upper sidewall portion terminating in an upper end and defining an open end of the container, the container also including a lid sized to mate with the upper sidewall portion, said method comprising the steps of:

providing a splash deflector with a central aperture sized sufficiently large to provide access with cooking tools to liquids cooking within the container through an open end, with the splash deflector deflecting liquids inward and downward away from the cover aperture to prevent the liquids from splashing outside of the container open end through the cover aperture;

releasable mounting the splash deflector to the container upper sidewall portion in a manner such that the splash deflector creates a substantially liquid tight seal with the container upper sidewall portion yet the splash deflector can be easily removed for cleaning the splash deflector and the container separately; and supporting the lid of the container proximate the splash deflector to create a closed container cooking environment, the supporting being done in a manner to allow ready removal of the lid and access to the liquids cooking in the container through the splash deflector central aperture.

* * * * *

UNITED STATES PATENT AND TRADEMARK OFFICE
CERTIFICATE OF CORRECTION

PATENT NO. : 4,832,225
DATED     : May 23, 1989
INVENTOR(S) : Larry R. Benjamin

It is certified that error appears in the above-identified patent and that said Letters Patent is hereby corrected as shown below:

In claim 2, column 5, line 59, delete "a" and substitute therefor --an--.

In claim 2, column 5, line 60, delete "splach" and substitute therefor --splash--.

In claim 3, column 6, line 2, delete "splach" and substitute therefor --splash--.

In claim 12, column 7, line 30, delete "annual" and substitute therefor --annular--.

Signed and Sealed this

Twentieth Day of March, 1990

Attest:

JEFFREY M. SAMUELS

Attesting Officer

Acting Commissioner of Patents and Trademarks